(12) United States Patent
Omi

(10) Patent No.: US 9,256,916 B2
(45) Date of Patent: Feb. 9, 2016

(54) IMAGE PROCESSING METHOD AND APPARATUS AND PROGRAM

(71) Applicant: GE MEDICAL SYSTEMS GLOBAL TECHNOLOGY COMPANY, LLC, Waukesha, WI (US)

(72) Inventor: Yasuo Omi, Tokyo (JP)

(73) Assignee: General Electric Company, Schenectady, NY (US)

( * ) Notice: Subject to any disclaimer, the term of this patent is extended or adjusted under 35 U.S.C. 154(b) by 100 days.

(21) Appl. No.: 14/258,081

(22) Filed: Apr. 22, 2014

(65) Prior Publication Data

US 2014/0314295 A1    Oct. 23, 2014

(30) Foreign Application Priority Data

Apr. 22, 2013 (JP) ................................. 2013-088963
Nov. 6, 2013 (JP) ................................. 2013-230466

(51) Int. Cl.
*G06K 9/00* (2006.01)
*G06T 3/00* (2006.01)
(Continued)

(52) U.S. Cl.
CPC ............ *G06T 3/0068* (2013.01); *G06K 9/4604* (2013.01); *G06K 9/6203* (2013.01); *G06T 7/0028* (2013.01); *G06T 2207/10081* (2013.01); *G06T 2207/10088* (2013.01); *G06T 2207/10132* (2013.01); *G06T 2207/30004* (2013.01)

(58) Field of Classification Search
CPC .............. G06T 3/00; G06T 5/00; G06K 9/46
USPC ........................................................ 382/131
See application file for complete search history.

(56) References Cited

U.S. PATENT DOCUMENTS 8,098,911 B2   1/2012  Chefd'Hotel et al.
8,369,597 B2   2/2013  Hyun et al.
(Continued)

FOREIGN PATENT DOCUMENTS

JP   2004-227519 A       9/2004
JP   2005301984 A  * 10/2005  ................ G06T 7/20
(Continued)

OTHER PUBLICATIONS

Real-Time Speckle Reduction and Coherence Enhancement in Ultrasound Imaging via Nonlinear Anisotropic Diffusion, Abd-Elmoniem et al., IEEE Transactions on Biomedical Engineering, vol. 49, No. 9, Sep. 2002, pp. 997-1014.
(Continued)

*Primary Examiner* — Gregory F Cunningham

(57) ABSTRACT

An image processing method for registering first and second images including the same subject is provided. The method includes the repeating the following steps multiple times: a first step including determining feature vectors related to gradients of pixels values at coordinates on the first and second images for each of the coordinates, a second step including calculating for all mutually corresponding coordinates on the first and second images, correlation values each equivalent to a value obtained by an N-th (where N is a natural number) power of an absolute value of an inner product of the feature vectors at the coordinates and determining an evaluation value including an integrated value of the correlation values calculated for each of the coordinates, and a third step including changing the second image in such that the evaluation value becomes larger.

20 Claims, 11 Drawing Sheets

(51) Int. Cl.
 *G06K 9/46* (2006.01)
 *G06T 7/00* (2006.01)
 *G06K 9/62* (2006.01)

(56) References Cited

U.S. PATENT DOCUMENTS

| | | |
|---|---|---|
| 2006/0004275 A1 | 1/2006 | Vija et al. |
| 2007/0167784 A1 | 7/2007 | Shekhar et al. |
| 2008/0009724 A1 | 1/2008 | Lee et al. |
| 2008/0123927 A1 | 5/2008 | Miga et al. |
| 2009/0324026 A1* | 12/2009 | Kletter .................. G06K 9/442 382/124 |
| 2010/0303340 A1* | 12/2010 | Abraham .............. G06T 7/0075 382/154 |

FOREIGN PATENT DOCUMENTS

| | | |
|---|---|---|
| JP | 2006-186622 A | 7/2006 |
| JP | 2013-020294 A | 1/2013 |
| JP | 2013-501290 A | 1/2013 |
| JP | 2013-059658 A | 4/2013 |

OTHER PUBLICATIONS

Miga et al., Visualization, Image-Guided Procedures, and Modeling, Progress in Biomedical Optics and Imaging, vol. 10, No. 37, dated 2009, pp. 20.

Maes, et al., Multimodality Image Registration by Maximization of Mutual Information, IEEE Transactions of Medical Imaging, vol. 16, No. 2, dated Apr. 1997. pp. 187-198.

Janine Olesch, Matching CT and ultrasound data of the liver by landmark constrained image registration, Proceeding of SPIE, SPIE, 2009, vol. 7261, pp. 72610G-1-72610G-7.

* cited by examiner

NORMALIZED GRADIENT FIELDS IN RELATED ART

NORMALIZED GRADIENT FIELDS WITH
THRESHOLD DETERMINATION

IMAGE PROCESSING METHOD AND APPARATUS AND PROGRAM

CROSS REFERENCE TO RELATED APPLICATIONS

This application claims the benefit of Japanese Patent Application No. 2013-088963 filed Apr. 22, 2013, and Japanese Patent Application No. 2013-230466 filed Nov. 6, 2013 which are hereby incorporated by reference in their entirety.

BACKGROUND OF THE INVENTION

The present invention relates to a registration technology between different images including the same subject.

As imaging apparatuses, there have heretofore been known, for example, a magnetic resonance apparatus (MR), a radiation tomography imaging apparatus (CT), an ultrasound apparatus, etc. These imaging apparatuses respectively have merits/demerits existing for every imaging modality and may be deficient in diagnosis accuracy only in an image by a specific imaging modality. Therefore, in recent years, attempts have frequently been made to improve diagnosis accuracy by performing a diagnosis using images based on a plurality of different imaging modalities.

In the diagnosis using the images by the different imaging modalities, image coordinate systems differ for every imaging modality. Therefore, a technology for correcting positional displacements due to the difference between these coordinate systems and variations/deformation of an organ, i.e., a technology for registration between images is important.

As a method of performing registration between a plurality of images different in imaging modality from each other, a method using mutual information is the most common (refer to, for example, IEEE Trans. on Med. Imaging, 16:187-198, 1997). This method is of an intensity based method based on the brightness value of an image in a broad sense. That is, it is a prerequisite that object images have to do with brightness values thereamong to perform registration using the mutual information.

In an ultrasound (US) image, however, an acoustic shadow occurs and hence a brightness value at the back of a high reflector is lowered more than the original value. The brightness value of each blood vessel also changes depending on the running direction of the blood vessel. Therefore, for example, in the registration between an MR image and a US image or the registration between a CT image and a US image, the situation in which brightness values have poor relevance often occurs. A feature based method other than the method based on the brightness values like the mutual information is suitable for such images.

As a typical example of the feature based method, there has been proposed a method using a normalized gradient field (NGF) (refer to, for example, Proceeding of SPIE Vol. 7261, 72610G-1, 2009). The normalized gradient field is that after primary partial differentiations (i.e., gradient vectors in respective directions x, y and z) have been calculated at coordinates on each image, the gradient vectors are normalized by their lengths (VectorNorm). That is, the normalized gradient field is a feature amount indicative of only the direction of gradient without depending on the magnitude of a pixel value or a brightness value and the magnitude of gradient. If the normalized gradient field in the same direction is generated at mutually corresponding positions in some two images, the positions of the two images can be assumed to be aligned. Thus, this method is capable of performing registering by optimizing the matching degree of the directions each indicated by the normalized gradient field.

The normalized gradient field n is mathematically described as follows:

$$n(I, p) := \begin{cases} \dfrac{\nabla I(p)}{\|\nabla I(p)\|}, & \text{if } \nabla I(p) \neq 0 \\ 0, & \text{otherwise} \end{cases} \quad \text{Equation 1}$$

In the Equation 1, $\Delta I(p)$ indicates a gradient vector at a coordinate p of an image I. Further, $\|\Delta I(p)\|$ indicates the length (Norm) of the gradient vector. The coordinate p is composed of components of x, y and z.

As can be understood from the Equation 1, the normalized gradient field n itself is not capable of separating a gradient caused by a structure and a gradient caused by noise. Thus, in order to suppress the influence of the gradient caused by noise, the following method has been proposed in Proceeding of SPIE Vol. 7261, 72610G-1, 2009:

$$n_\varepsilon(I, p) := \dfrac{\nabla I(p)}{\|\nabla I(p)\|_\varepsilon} \quad \text{Equation 2}$$

$$\|\nabla I(p)\|_\varepsilon := \sqrt{\nabla I(p)^T \nabla I(p) + \varepsilon^2} \quad \text{Equation 3}$$

$$\varepsilon = \eta \dfrac{\int_\Omega [\nabla I(p)] dp}{\int_\Omega dp} \quad \text{Equation 4}$$

where $\varepsilon$ is a constant arbitrarily selected according to the amount of noise in an image. In the related art method, the noise term $\varepsilon$ is set in accordance with the Equation 4, and the gradient vector is normalized in consideration of the noise term.

An evaluation function D taken to be a registration index is defined by the following equations (it may be defined by either one of them).

$$D(T,R) = \int_\Omega <n(R,p), n(T,p)>^2 dp \quad \text{Equation 5}$$

$$D(T,R) = \int_\Omega \|n(R,p) \times n(T,p)\|^2 dp \quad \text{Equation 6}$$

In Equations 5 and 6, T and R respectively indicate two images targeted for registration. Equation 5 calculates an integrated value of the square of an inner product of two normalized gradient fields n(R,p) and n(T,p). Equation 6 calculates an integrated value of the square of an outer product of two normalized gradient fields n(R,p) and n(T,p).

In the image registration method using the above-mentioned normalized gradient fields, the vector caused by nose takes a small value on the normalized gradient field. Since, however, the evaluation functions take the integrated values of the inner products or the outer products at all coordinates as in Equations 5 and 6, it is not ignored how they will affect the evaluation functions if the absolute number thereof increases, even though they are individually small values. Therefore, the influence of gradient due to noise may not be eliminated sufficiently.

With the foregoing in view, there has been desired a registration method capable of more effectively suppressing the influence of gradient due to noise in registration between two images including the same subject.

BRIEF DESCRIPTION OF THE INVENTION

In one aspect, an image processing method for registering first and second images including the same subject is provided. The method includes repeating plural times the following steps: a first step of determining feature vectors related to gradients of pixels values at coordinates on the first and second images for every the coordinates and of when the size of each of gradient vectors for the pixel values at the coordinates is greater than or equal to a predetermined threshold, determining the gradient vectors each normalized by the size of the gradient vector as the feature vectors at the coordinates and when the size of the gradient vector is less than the predetermined threshold, determining a zero vector as the feature vectors at the coordinates, and a second step of calculating for every mutually corresponding coordinates on the first and second images, correlation values each equivalent to a value obtained by N (where N is a natural number)-th power of the absolute value of an inner product of the feature vectors at the coordinates and determining an evaluation value including an integrated value of the correlation values calculated for every the coordinates, and a third step of changing the second image in such a manner that the evaluation value becomes larger.

In another aspect, An image processing apparatus is provided. The image processing apparatus includes a determining unit which when the size of each of gradient vectors for pixel values at coordinates on first and second images including the same subject is greater than or equal to a predetermined threshold, determines for every the coordinates, the gradient vectors each normalized by the size of the gradient vector as feature vectors at the coordinates and determines, when the size of the gradient vector is less than the predetermined threshold, a zero vector as the feature vectors at the coordinates, a calculating unit which for every mutually corresponding coordinates on the first and second images, calculates correlation values each equivalent to a value obtained by N (where N is a natural number)-th power of the absolute value of an inner product of the feature vectors at the coordinates and determines an evaluation value including an integrated value of the correlation values calculated for every coordinates, and a changing unit which changes the second image in such a manner that the evaluation value becomes larger, wherein the processing by the determining unit, the calculating unit and the changing unit is repeated plural times to register the first and second images.

According to the above aspects, when the magnitude of a gradient vector is less than a predetermined threshold, a feature vector becomes a zero vector. Therefore, the feature vector is composed of only components by a main structure. Since an evaluation value for registration between images includes an integrated value of a correlation value obtained by the N-th power of the absolute value of an inner product of feature vectors for every coordinates, the influence of the gradient vector due to noise is effectively suppressed.

DETAILED DESCRIPTION OF THE INVENTION

An exemplary embodiment will hereinafter be described. Incidentally, the disclosure is not limited to or by the embodiment.

Figure 1:
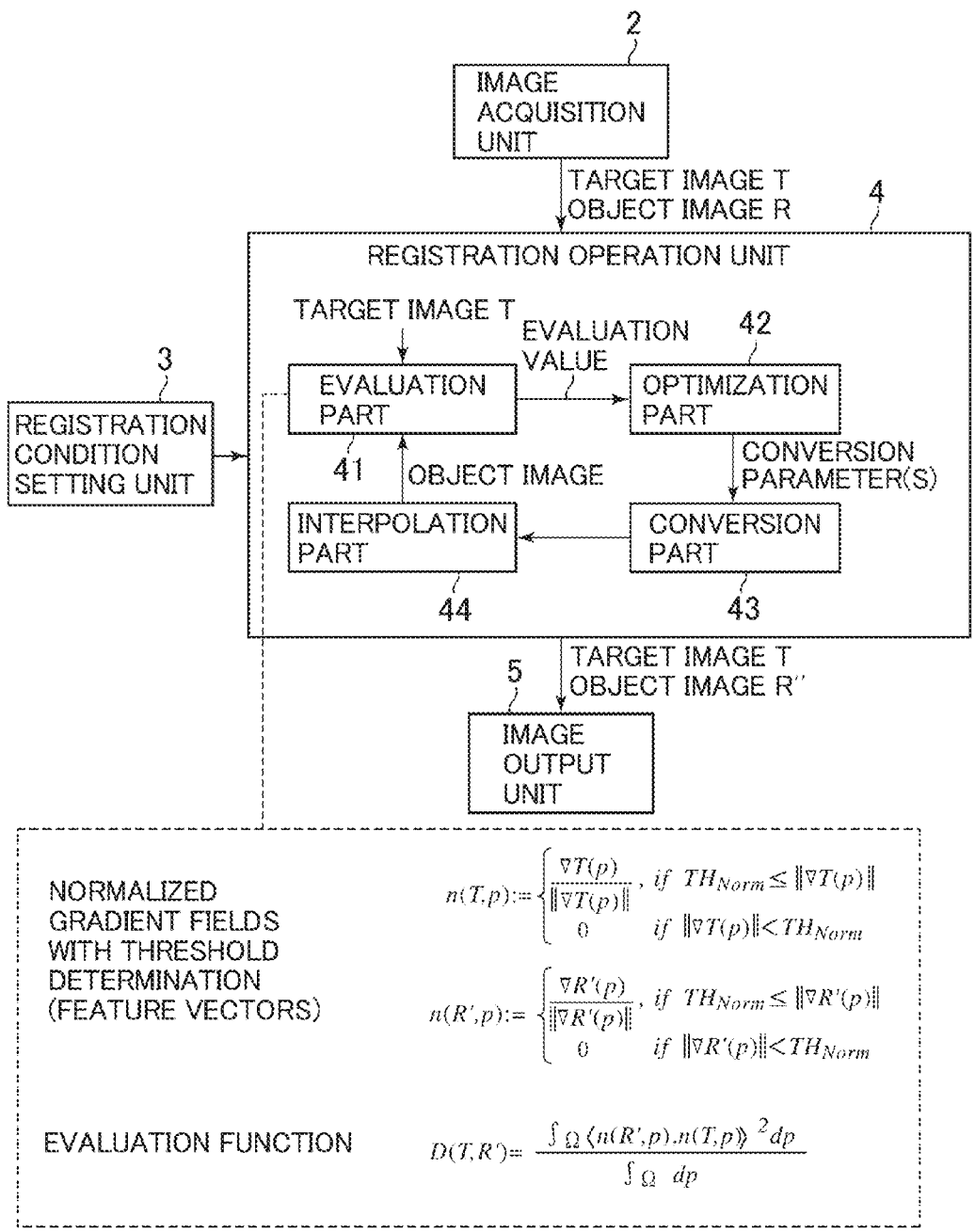
FIG. 1 is a diagram schematically showing a configuration of an image processing apparatus according to an exemplary embodiment.

FIG. 1 schematically shows the configuration of an image processing apparatus 1 according to the exemplary embodiment. As show in the same figure, the image processing apparatus 1 has an image acquisition unit 2, a registration condition setting unit 3, a registration operation unit 4, and an image output unit 5.

The image acquisition unit 2 acquires two images different in imaging modality from each other. Normally, the two images are input and acquired according to the operation of a user. The image acquisition unit 2 sets one of the two images to a target image T fixed in registration processing and sets the other thereof to an object image R changed in registration processing. Incidentally, in the exemplary embodiment, the original object image acquired is expressed in R, the object image being in registration processing is expressed in R', and the object image after the registration processing is expressed in R", respectively.

The registration condition setting unit 3 sets an optimization parameter that is a condition for a registration operation according to the operation of the user. Setting the optimization parameter will be described in detail later.

The registration operation unit 4 performs a registration operation in accordance with the set optimization parameter. The registration operation is done by repeating a process for making small changes such as movement, deformation, etc. to the object image R' and a process for calculating an evaluation value of registration between the target image T and the object image R', in the direction in which the evaluation value is improved.

In the exemplary embodiment, as shown in FIG. 1, the registration operation unit 4 has an evaluation part (determining unit and calculating unit) 41, an optimization part (changing unit) 42, a conversion part (changing unit) 43, and an interpolation part (changing unit) 44. Incidentally, it is a configuration diagram often used in schematizing the registration operation unit 4. The evaluation part 41, the optimization part 42, the conversion part 43 and the interpolation part 44 are also called a Cost Function, an Optimizer, a Transformer, and an Image Interpolator, respectively.

The registration operation unit 4 performs a registration operation by repeatedly performing processes of these parts designated at 41 through 44 plural times. Incidentally, the evaluation part 41 is one example illustrative of determining unit and calculating unit. Further, the optimization part 42, the conversion part 43 and the interpolation part 44 are one example illustrative of changing unit. The processes of these parts 41 through 44 will hereinafter be described in detail while referring to some FIGs.

Figure 2:
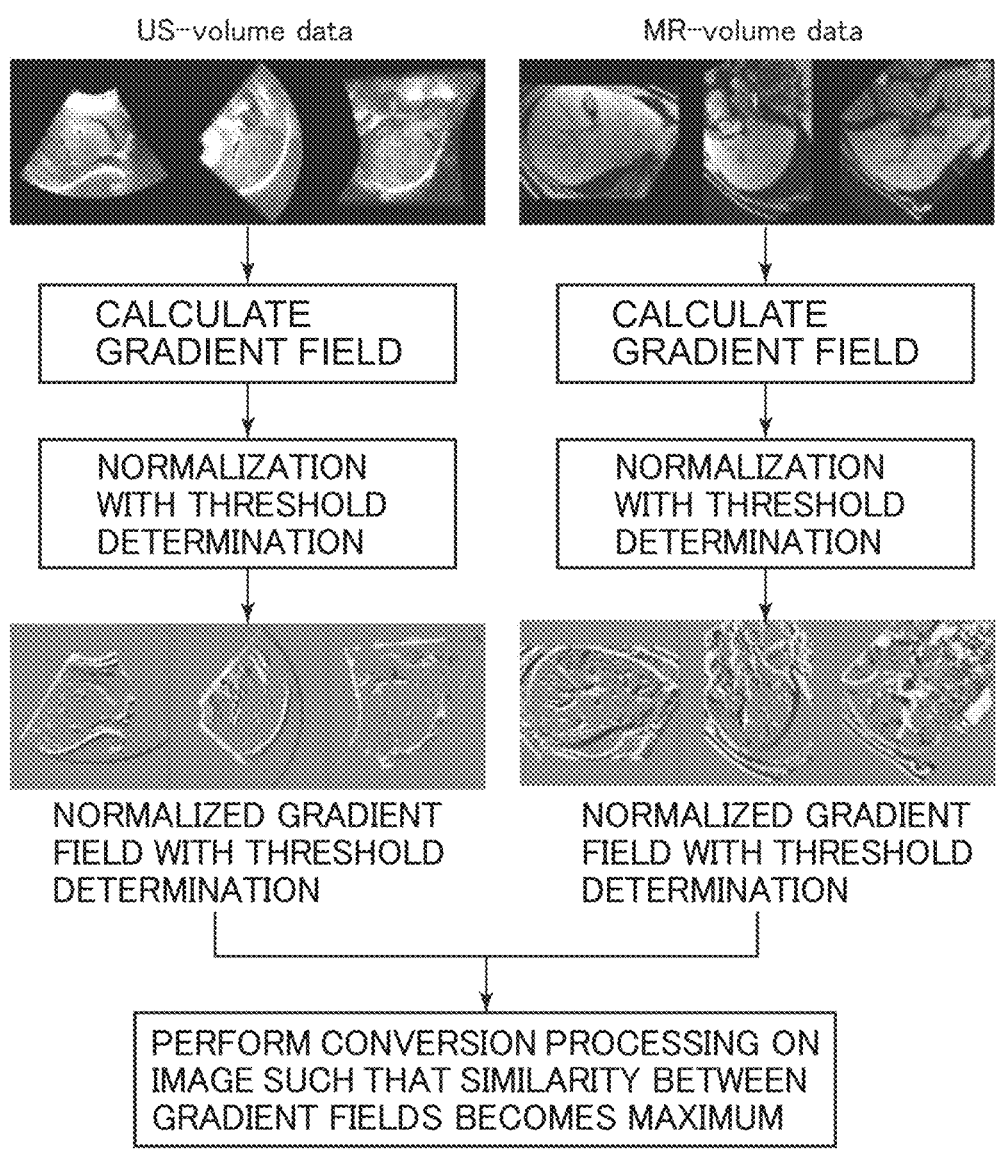
FIG. 2 is a conceptual diagram of a registration operation.

FIG. 2 shows a conceptual diagram of a registration operation. In FIG. 2, a US image and an MR image at an abdominal region (liver) are shown as examples of a target image T and an object image R targeted for registration.

The evaluation part 41 calculates primary partial differentiations (i.e., gradient vectors in x, y and z directions) for every coordinates p with respect to the target image T and the object image R'. At this time, at least one of filter processing for emphasizing a structure such as the blood vessel and filter processing for reducing noise may be performed on the target image T and the object image R' before the calculation of the gradient vectors. Incidentally, as these filter processing, filter processing specific to the US image in particular can be used in addition to common existing structure emphasis filter processing and noise reduction filter processing. As the filter processing specific to the US image, there are considered filter processing disclosed in, for example, Real-Time Speckle Reduction and Coherence Enhancement in Ultrasound Imaging via Nonlinear Anisotropic Diffusion, khaled Z. Abd-Elmoniem, Student Member, IEEE, About-Bakr M. Youssef, and Yasser M. Kadah*, Member, IEEE (IEEE TRANSACTIONS ON BIOMEDICAL ENGINEERING, VOL. 49, NO. 9, SEPTEMBER 2002), etc.

Next, normalized gradient fields with threshold determination (feature vectors) n(T, p) and n(R', p) are respectively calculated in accordance with the following equations, based on the previously determined gradient vectors ΔT(p) and ΔR'(p) for every coordinates p with respect to the target image T and the object image R':

$$n(T, p) := \begin{cases} \frac{\nabla T(p)}{\|\nabla T(p)\|}, & \text{if } TH_{Norm} \leq \|\nabla T(p)\| \\ 0, & \text{if } \|\nabla T(p)\| < TH_{Norm} \end{cases} \quad \text{Equation 7}$$

$$n(R', p) := \begin{cases} \frac{\nabla R'(p)}{\|\nabla R'(p)\|}, & \text{if } TH_{Norm} \leq \|\nabla R'(p)\| \\ 0, & \text{if } \|\nabla R'(p)\| < TH_{Norm} \end{cases} \quad \text{Equation 8}$$

where, $TH_{Norm}$ is a threshold relative to the length (Norm) of the gradient vector. Vector's Norms are calculated to all gradient vectors. If Norms are less than the threshold, they are taken to be gradient vectors caused by noise, and the normalized gradient field with the threshold determination is taken to be a 0 vector. Thus, only a vector caused by a structure, in other words, a vector giving information significant for registration is extracted with respect to the normalized gradient field with the threshold determination. Incidentally, the threshold $TH_{Norm}$ is determined based on, for example, experiments and experience. Further, the threshold $TH_{Norm}$ may be a value common between the target image T and the object image R' or values independent of each other.

Figure 3:
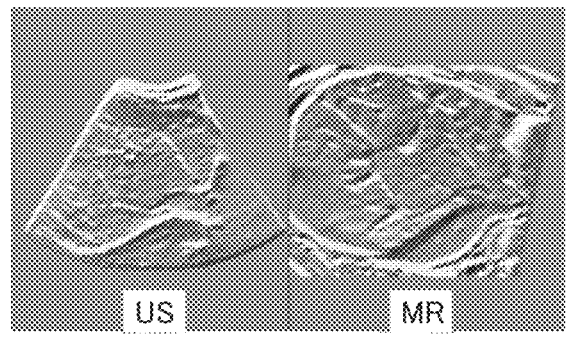
FIG. 3 is a diagram illustrating an example of normalized gradient fields by the related art method.
Figure 4:
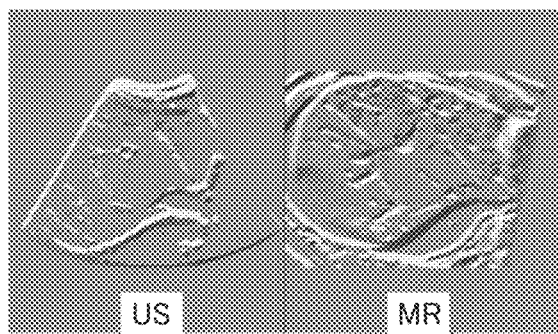
FIG. 4 is a diagram showing an example of normalized gradient fields with threshold determination by an exemplary method.

FIG. 3 shows an example illustrative of normalized gradient fields by the related art method. On the other hand, FIG. 4 shows an example illustrative of normalized gradient fields with threshold determination by the exemplary method (to empirically determine the threshold THNorm), also referred to herein as the present proposed method. According to the exemplary method, it is understood that gradient fields caused by noise have been eliminated, and only gradient fields caused by a main structure in an organ, which can be a target for registration, become dominant.

After the feature vectors have been calculated, the value (evaluation value) of an evaluation function D(T, R') indicative of the complete or matching degree of the gradient fields is calculated for every coordinates p that correspond to each other in the target image T and the object image R'. The evaluation function D is defined as follows:

$$D(T, R') = \frac{\int_\Omega \langle n(R, p), n(T, p) \rangle^2 \, dp}{\int_\Omega dp} \quad \text{Equation 9}$$

That is, the evaluation function D(T, R') is a normalization of an integrated value of the "square of inner product of feature vectors" (correlation value) at each coordinate p on the target image T and the object image R', i.e., an added value or the sum thereof with the size of an image, i.e., the total number of pixels of the image.

If some two vectors are parallel, the inner product value thereof takes a maximum value. If they are vertical, the inner product value thereof takes a minimum value. Thus, if a positional relationship between two images is optimized in such a manner that the evaluation function D of the Equation 9 becomes a maximum value, the gradient fields of the two images approximate to parallel so that their registration is achieved.

Incidentally, the calculation of the value of the evaluation function by the evaluation part 41 is performed each time the object image R' is changed and updated.

The optimization part 42 repeatedly determines and changes conversion parameter(s) of the object image R', based on the calculated value of evaluation function to optimize the conversion parameter(s). The conversion parameter(s) is parameter(s) which defines the orientation of the object image R' relative to a change such as the parallel movement, rotation, deformation or the like of the object image R', and the amount of its change. A rule for optimizing the conversion parameter(s) is as follows for example:

First, the conversion parameter(s) is shifted in the direction set in advance. Second or later, the conversion parameter(s) is shifted in the same direction as previous when the value of the evaluation function D is more improved than the last time. When the value of the evaluation function D is deteriorated, the conversion parameter(s) is shifted in the reverse direction. A step width to shift the conversion parameter(s) is started from the "maximum step width" set in advance. Then, when the conversion parameter(s) is shifted in the reverse direction, a step width obtained by multiplying a step width at that time by a "mitigation coefficient" set in advance is taken to be a new step width.

Incidentally, as a method for optimizing the conversion parameter(s) by the optimization part 42, there can be used, for example, a Gradient Descent method, a Conjugate gradient method, an LBFGS method, a Gauss-Newton method, a Levenberg-Marquardt method, an Amoeba method, etc.

The conversion part 43 performs conversion processing on the object image R' in accordance with the conversion parameter(s) determined by the optimization part 42.

Incidentally, as a method for performing the conversion processing on the object image R' by the conversion part 43, there can be used, for example, an Euler Transform, an Affine Transform, a B-Spline Transform, a Versor Transform, a Quaternion Transform, etc.

The interpolation part 44 performs interpolation processing on the image conversion-processed by the conversion part 43 and calculates pixel values of pixels at respective coordinates. After the conversion processing has been performed on the object image R', the pixels are not often superimposed on the coordinate positions except in special cases such as the parallel movement at each pixel width unit, etc. It is therefore necessary to determine a pixel value at each coordinate by such interpolation processing. After the interpolation processing has been completed, the object image R' has been updated.

Incidentally, as a method for performing the interpolation processing by the interpolation part 44, there can be used, for example, Nearest Neighbor Interpolation, Linear Interpolation, B-Spline Interpolation, etc.

The registration operation unit 4 repeats the processing of the evaluation part 41 through the interpolation part 44 plural times. When the difference between the last value of the evaluation function and the present value thereof reaches less than the "tolerance" set in advance, when the step width reaches the "minimum step width" set in advance, or when the number of repetitions of operation for shifting the conversion parameter(s) reaches the "upper limit number of times of repetitive operations" set in advance, the repetitive operation is ended.

The registration condition setting unit 3 sets optimization parameters in the repetitive operation for shifting the conversion parameter(s) by the optimization part 42. The optimization parameters include the above-described "maximum step width", "minimum step width", "upper limit number of times of repetitive operations", "tolerance" and "mitigation coefficient", etc.

After the registration operation has been ended, the image output unit 5 outputs a target image T and an aligned object image R".

Figure 5:
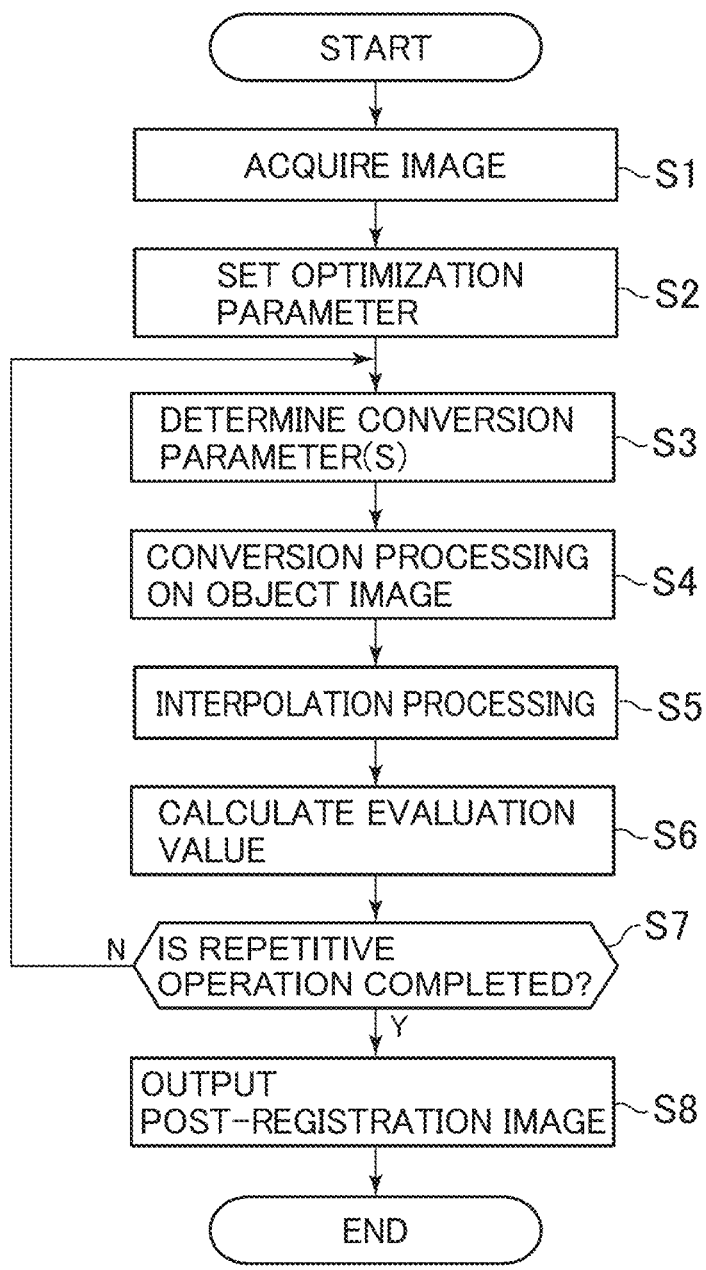
FIG. 5 is a flow diagram of image registration processing by the image processing apparatus according to the exemplary embodiment.

A description will hereinafter be made of the flow of image registration processing by the image processing apparatus according to the exemplary embodiment. FIG. 5 is a flow diagram of the image registration processing by the image processing apparatus according to the exemplary embodiment.

At step S1, the image acquisition unit 2 acquires two images to be aligned. Then, the image acquisition unit 2 sets one of the two images as a target image T and sets the other thereof as an object image R.

At step S2, the registration condition setting unit 3 sets optimization parameters. The optimization parameters include a maximum step width, a minimum step width, the upper limit number of times of repetitive operations, a tolerance for registration, a mitigation coefficient, etc.

At step S3, the optimization part 42 determines a conversion parameter(s) (parallel movement, rotational movement, deformation or the like) for an object R'. When the value of the evaluation function D is more improved than the last time, the conversion parameter(s) is shifted in the same direction as previous. When the value of the evaluation function D is deteriorated in reverse, the conversion parameter(s) is shifted in the reverse direction. An appropriate conversion parameter(s) is first determined.

At step S4, the conversion part 43 performs conversion processing on the object image R' in accordance with the determined conversion parameter(s).

At step S5, the interpolation part 44 performs interpolation processing on the object image R'.

At step S6, the evaluation part 41 calculates the value of the evaluation function D (T, R'), i.e., its evaluation value.

At step S7, the registration operation unit 4 determines the end of a repetitive operation. When the number of times of repetition reaches a predetermined number or the value of the evaluation function substantially converges (when the value reaches the tolerance or the shift amount of the conversion parameter(s) reaches less than the minimum step width), the repetitive operation is completed and the registration operation unit 4 proceeds to step S8. Otherwise, the registration operation unit 4 returns to step S3.

At step S8, the image output unit 5 applies a final conversion parameter(s) to the object image and outputs a post-registration image therefrom.

Figure 6:
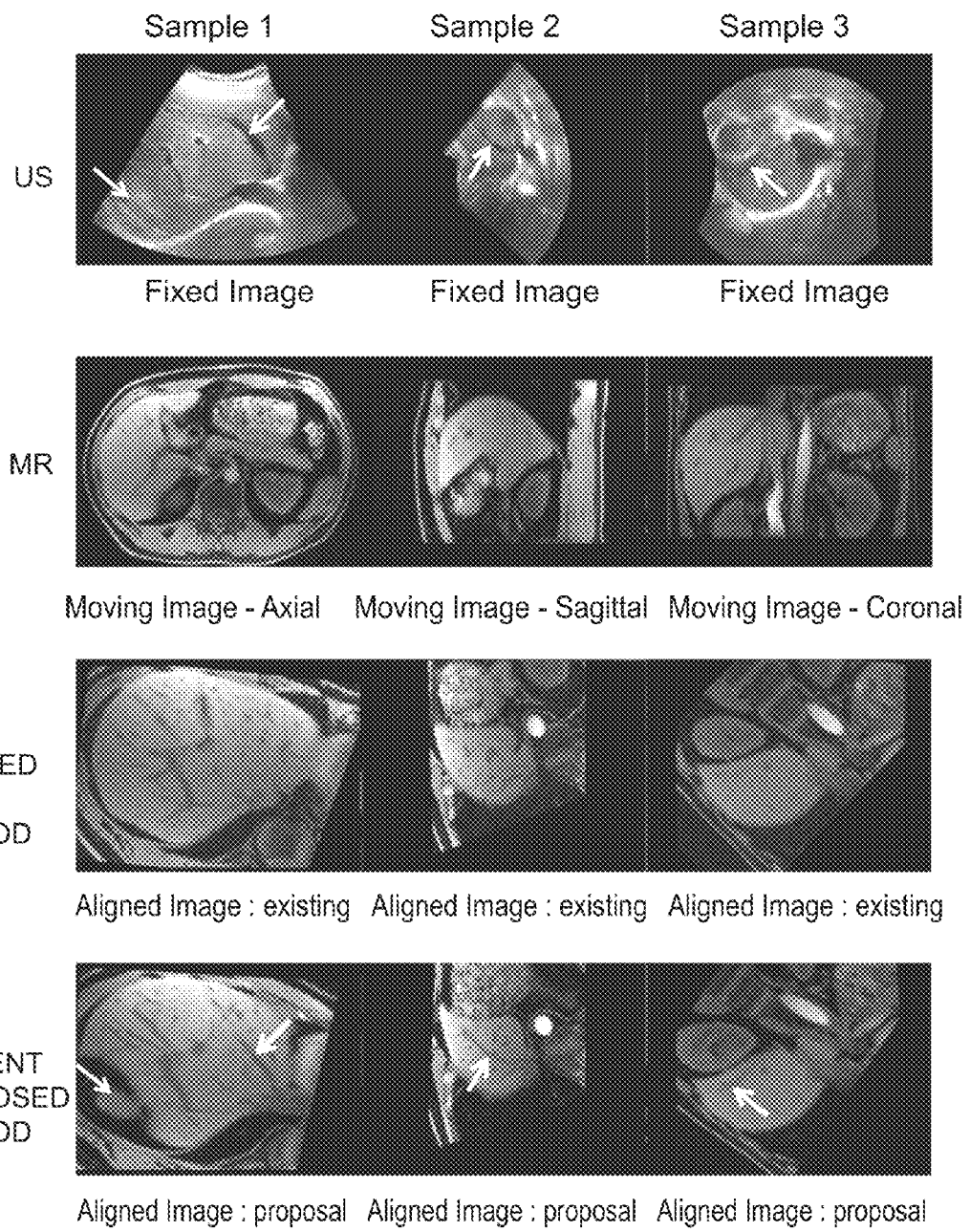
FIG. 6 is a diagram showing an example illustrative of image registration by the related art method and the exemplary method.

FIG. 6 shows an example illustrative of image registration by the related art method and the exemplary method (to empirically determine the threshold $TH_{Norm}$). There are shown in FIG. 6, cross-sections for Axial, Sagittal and Coronal sequentially from the left, and a target image (US image in the present example), an object image (MR image in the present example), an aligned image by the related art method and an aligned image by the present proposed method in the order from the upside. Arrows in the drawing indicate points where an improvement in the registration accuracy can be conspicuously visually recognized between the related art method and the exemplary method.

(Modification)

The above threshold $TH_{Norm}$ may be determined on the basis of the estimated result of noise quantity based on at least one of the target image T and the object image R'.

Figure 7:
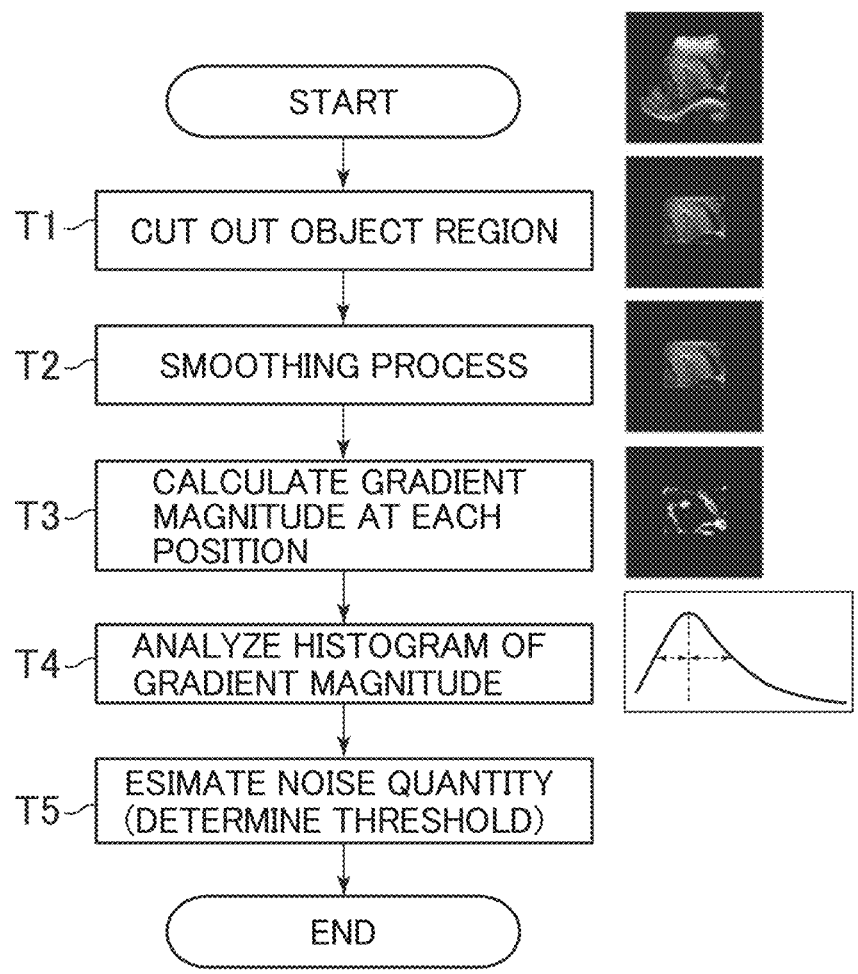
FIG. 7 is a flow diagram of a process for estimating the quantity of noise in an image, based on at least one of a target image T and an object image R'.

FIG. 7 is a flow diagram of a process for estimating the quantity of noise in an image on the basis of at least one of the target image T and the object image R'.

At Step T1, an object region for estimating a noise quantity is set to at least one of the target image T and the object image R'. It is desirable that the object region is set so as to exclude these because not only an organ to be diagnosed but also other organs are included in the image. There is also a case where in an organ or a medical image, the noise quantity is not constant but varies depending on an image position. Therefore, the noise quantity can be estimated more effectively by limiting an object region to estimate the noise quantity to a range (for example, the periphery of a lesion or the like) to be diagnosed intensively. As a range to be cut out as the object region, there may be mentioned, for example, a first partial range located in the center of an image, a second partial range located around the lesion, or a third partial range located around an anatomical feature point common between the target image T and the object image R', and the like. The first partial range can be set to, for example, an image central range in a range corresponding to an FOV, which has an area equivalent to ½ to ⅓ of the whole FOV, etc. The second partial range can be set to, for example, a range which is around a lesion such as a tumor and has a volume of 50 to 100 $mm^3$, etc. Further, the third partial range can be set to, for example, a range which is around a common anatomical feature point such as a bone shape, a blood vessel shape or a blood vessel branch or the like and has a volume of 50 to 100 $mm^3$ The object region may be set manually or automatically. In the case of the automatic setting, a process for detecting the lesion or the anatomical feature point is executed as needed. Incidentally, subsequent processes are executable even if the present Step is not executed, but the present Step is may be carried out to estimate an accurate noise quantity. When the present Step is not executed, the object region is taken to be a region of the entire image.

At Step T2, a smoothing process is performed on the object region set at Step T1. The smoothing process may be known filtering of a Gaussian filter or the like.

At Step T3, a gradient magnitude at each image position is calculated with respect to the image already subjected to the smoothing process, which has been generated at Step T2 to generate a gradient magnitude image in which a pixel value of a pixel corresponding to each image position is taken as a gradient magnitude at the image position. As is well known, the gradient magnitude is obtained by calculating the magnitude of primary partial differential, i.e., a gradient vector in each of x, y and z directions.

Figure 8:
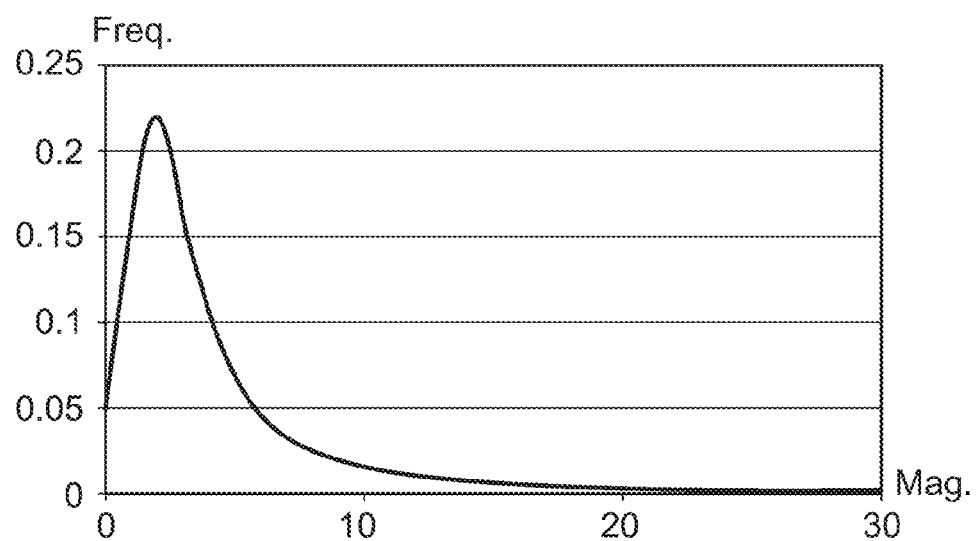
FIG. 8 is a diagram showing an example of a histogram of gradient magnitudes in a gradient magnitude image.

At Step T4, a histogram of gradient magnitudes at each image position is calculated with respect to the gradient magnitude image generated at Step T3 to analyze a feature amount of the histogram. An example of the histogram of the gradient magnitudes is shown in FIG. 8. In the histogram of FIG. 8, the horizontal axis indicates a gradient magnitude, and the vertical axis indicates the relative number of times of frequencies. In the case of a gradient caused by noise, its magnitude is a relatively low value, and its relative frequency concentrates on low values on the histogram. On the other hand, in the case of a gradient caused by a structure, its magnitude assumes a relatively middle/high value, and its frequency is distributed over a wide range. Thus, in the histogram of FIG. 8, a crest that appears in a region low in gradient magnitude can be considered to correspond to the gradient caused by noise.

Figure 9:
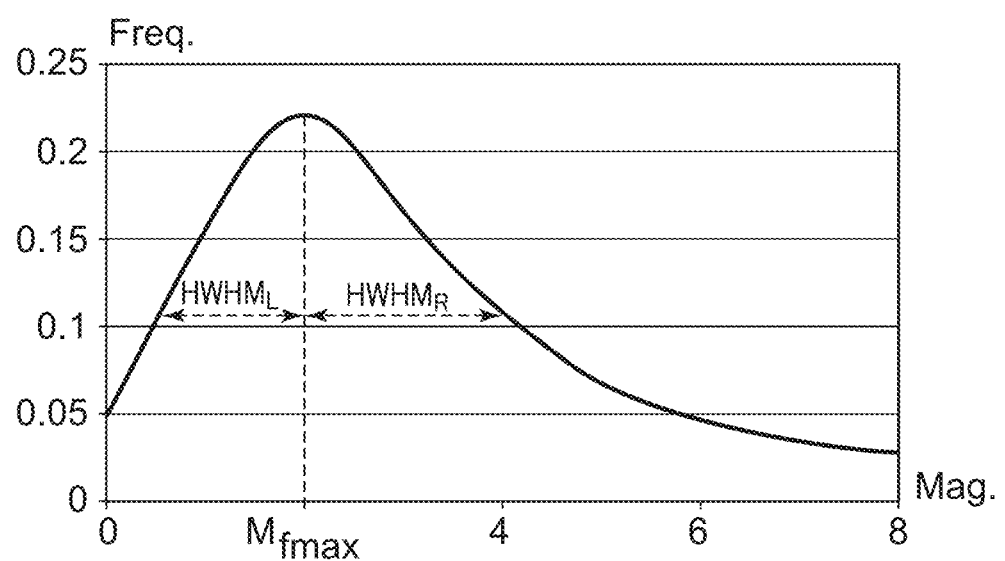
FIG. 9 is a first diagram showing feature amounts to be analyzed in the histogram of the gradient magnitudes.

Feature amounts to be analyzed here are as follows (refer to FIGS. 9 and 10):

Gradient magnitude which provides a most frequent value at a peak lowest in gradient magnitude, of several peaks which appear on a histogram distribution ($M_{fmax}$ in FIG. 9), Half width at half maximum on the low value side as viewed from $M_{fmax}$ on the histogram distribution ($HWHM_L$ in FIG. 9), Half width at half maximum on the high value side as viewed from $M_{fmax}$ on the histogram distribution ($HWHM_R$ in FIG. 9).

Figure 10:
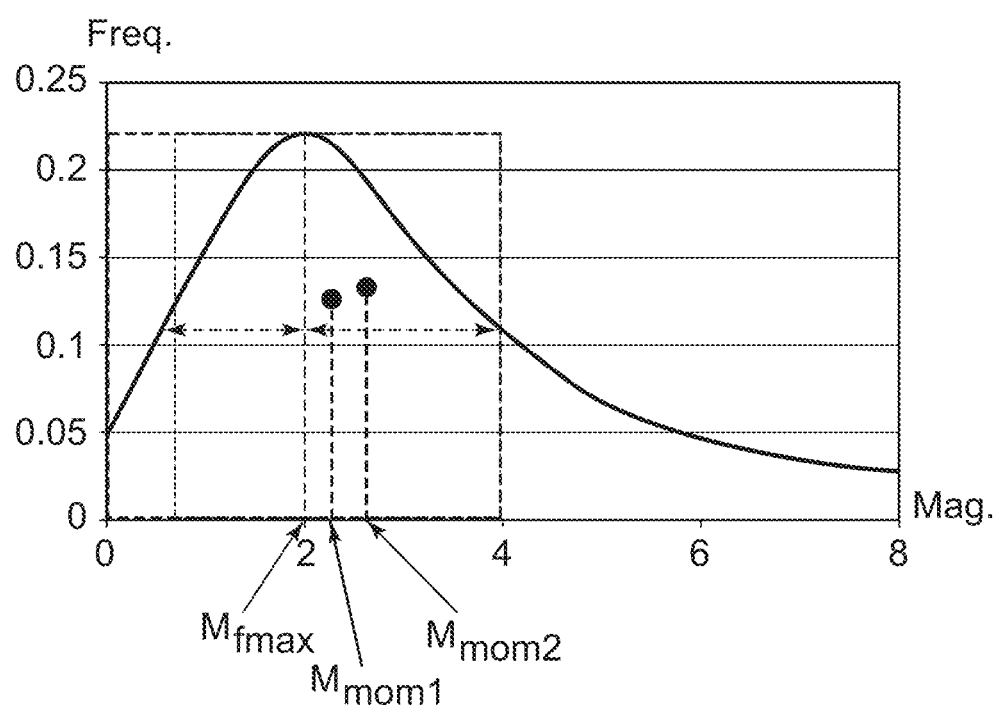
FIG. 10 is a second diagram showing feature amounts to be analyzed in the histogram of the gradient magnitudes.

Gradient magnitude equivalent to the center of gravity of a range in which the gradient magnitude on the histogram distribution is from 0 to $HWHM_R$ ($M_{mom1}$ in FIG. 10), and Gradient magnitude equivalent to the center of gravity of a range in which the gradient magnitude on the histogram distribution is from $HWHM_L$ to $HWHM_R$ ($M_{mom2}$ in FIG. 10).

A noise quantity is calculated at Step T5. The noise quantity Nqt is calculated from any one of the following Equations a through f or the average value of a plurality of combinations thereof:

$$Nqt = M_{fmax} + \sigma \times HWHM_L \quad \text{Equation a}$$

$$Nqt = M_{fmax} + \sigma \times HWHM_R \quad \text{Equation b}$$

$$Nqt = M_{fmax} + \sigma \times (HWHM_L + HWHM_R)/2 \quad \text{Equation c}$$

$$Nqt = \sigma \times M_{fmax} \quad \text{Equation d}$$

$$Nqt = \sigma \times M_{mom1} \quad \text{Equation e}$$

$$Nqt = \sigma \times M_{mom2} \quad \text{Equation f}$$

where σ is an arbitrary constant and, in some embodiments, a value of about 2.0 to 3.0 when a user intends to intensively register only relatively large structures to set σ to a larger value. When the user intends to perform registration inclusive of even a relatively small structure, it is desirable to set σ to a smaller value.

The threshold $TH_{Norm}$ is determined based on the estimated noise quantity Nqt, but in the present example, the noise quantity Nqt is used as the threshold $TH_{Norm}$ as it is.

Incidentally, when the threshold $TH_{Norm}$ is used in common between the target image T and the object image R', the threshold is determined by methods such as (1) determining the threshold $TH_{Norm}$ from an estimated result of noise quantity at the target image T, (2) determining the threshold $TH_{Norm}$ from an estimated result of noise quantity at the object image R', (3) determining the threshold $TH_{Norm}$ using the estimated result of noise quantity at the target image T and the estimated result of noise quantity at the object image R' comprehensively, etc. Further, when the threshold $TH_{Norm}$ is determined separately between the target image T and the object image R', the threshold $TH_{Norm}$ for the target image T is determined from the estimated result of noise quantity at the target image T, and the threshold $TH_{Norm}$ for the object image R' is determined from the estimated result of noise quantity at the object image R'.

Figure 11:
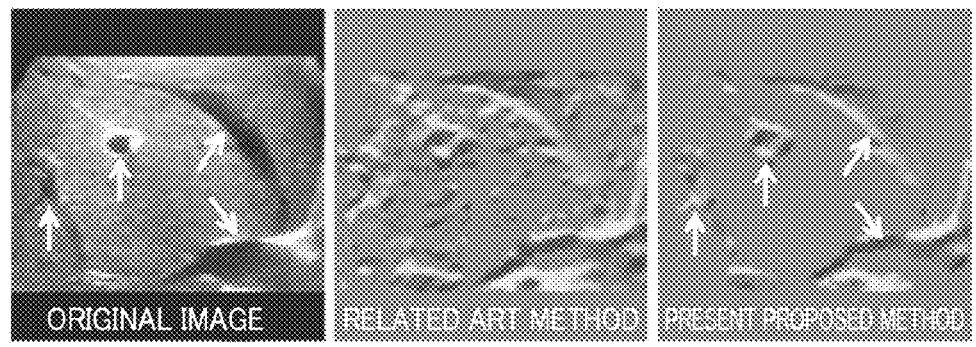
FIG. 11 shows an example of a normalized gradient field by the related art method, and an example of a normalized gradient field with threshold determination by the present proposed method (to determine a threshold THNorm from an automatic estimated result of noise quantity)

FIG. 11 shows an example of a normalized gradient field by the related art method, and an example of a normalized gradient field with threshold determination by the exemplary method (to determine the threshold $TH_{Norm}$ from the automatic estimated result of noise quantity). This figure shows an example in which a normalized gradient field at a left end image (abdominal US image) is calculated. As is understood from FIG. 11, not only a gradient field derived from a structure but also a gradient field derived from noise are included in the related art method, but in the exemplary method, only a gradient field derived from a structure is drawn appropriately (refer to a white line in FIG. 11).

Figure 12:
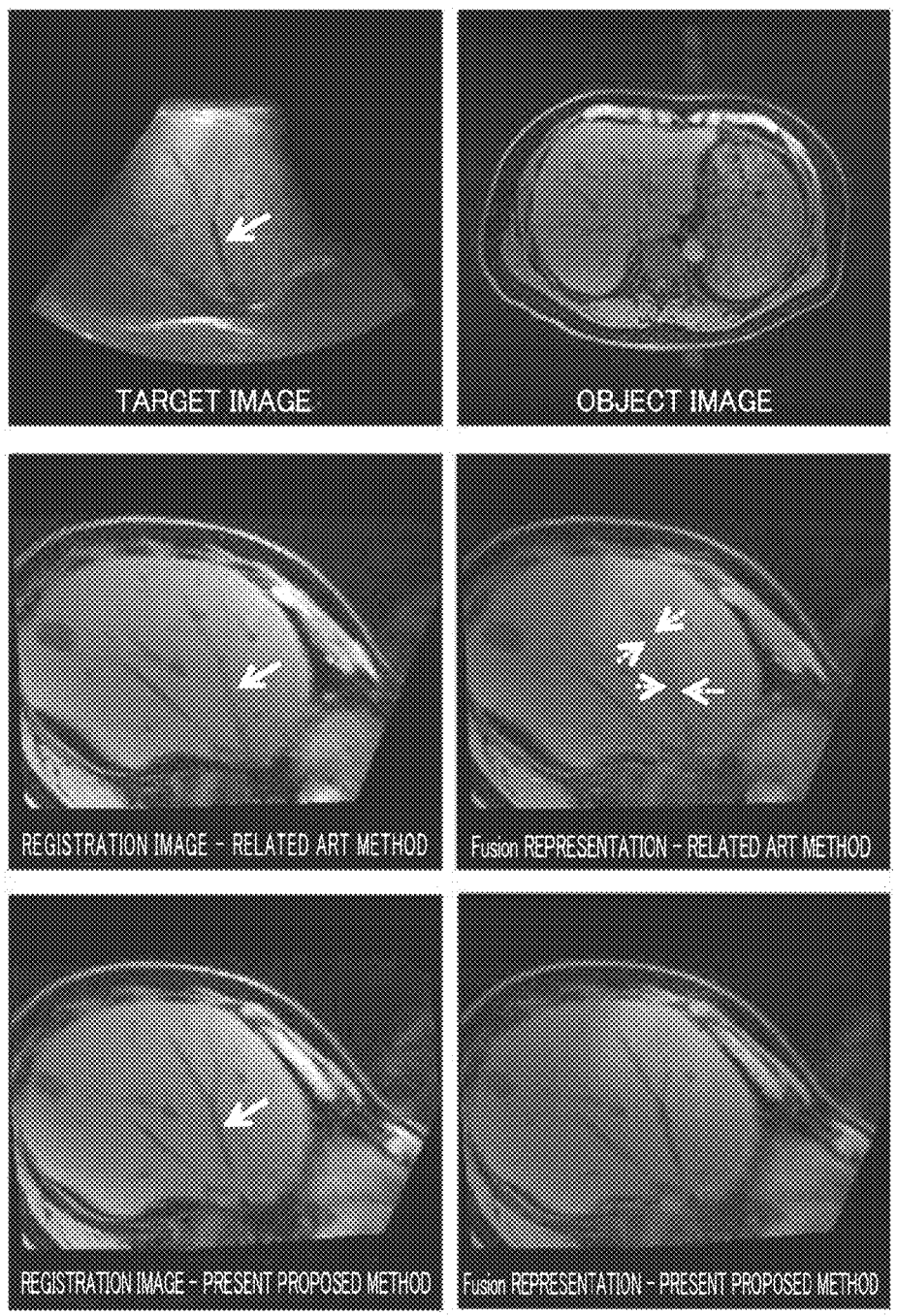
FIG. 12 shows another example illustrative of image registration by the related art method and the exemplary method (to determine the threshold THNorm from the automatic estimated result of noise quantity).

FIG. 12 shows another example illustrative of image registration by the related art method and the exemplary method (to determine the threshold $TH_{Norm}$ from the automatic estimated result of noise quantity). Images in FIG. 12 respectively represent a target image (abdominal US image in the present example), an object image (abdominal MR image in the present example), a registration image by the related art method, a Fusion representation of the target image and the registration image by the related art method, a registration image by the exemplary method, and a Fusion representation of the target image and the registration image by the exemplary method, The US image and the MR image are both 3D-scanned images, but only a typical one cross-section is displayed in FIG. 12. It becomes slightly difficult to visualize each blood vessel indicated by a white line in the related art method, but it is possible to visualize it in the exemplary method. As indicated by white dotted lines in FIG. 12, misregistration that has not been corrected yet is observed between the target image and the registration image, whereas in exemplary method, registration is achieved without almost causing the misregistration.

Thus, according to the image processing apparatus according to the exemplary embodiment, high accuracy registration is enabled as described below.

In the related art method, the gradient vector caused by noise takes the small value on the normalized gradient field. As shown in Equations 5 and 6, however, the evaluation function takes the integrated values of the inner or outer products in all coordinates. Therefore, even if each of the inner or products is of the small value, it is not possible to ignore effects on the evaluation function if the absolute number thereof is large. On the other hand, in the exemplary method, when the magnitude of a gradient vector is less than the threshold $TH_{Norm}$, the normalized gradient field with threshold determination becomes a zero vector. Therefore, the normalized gradient field with threshold determination is comprised of only the component based on the main structure. The influence of each gradient vector caused by noise is effectively suppressed.

Further, in the related art method, as shown in Equations 5 and 6, the integrated value of the square of the inner or outer product of the two normalized gradient fields has been calculated, and the value of the evaluation function depends on the size of the image (total number of pixels). It is therefore difficult to predict registration accuracy from the absolute value of the evaluation function. Since the evaluation function is normalized based on the total number of pixels of the image in the exemplary method, the absolute value of the evaluation function and the registration accuracy have a correlation. If two images to be registered are completely the same, the value of the evaluation function D in Equation 8 becomes 1.0. Also if in the two images to be registered, pixels of 50% are the same and the remaining pixels of 50% have no similarity, the value of the evaluation function D in Equation 8 becomes 0.5. Thus, if the user specifies registration accuracy to be desired in advance, it is possible to easily determine whether the calculated result of registration satisfies the desired accuracy.

The two images are not necessarily imaged in the same period in the diagnosis of multimodality by the images. There is also a possibility that a significant difference in time will exist. It is also estimated that, for example, one of the images has been imaged before surgery, and the other thereof has been imaged after surgery. In this case, a lesion existing only on one image does not necessarily exist on the other image. Thus, when a gradient vector caused by the lesion exists only on one image, such a gradient vector may be excluded from the calculation of the evaluation function. In the related art method, however, when the gradient vector caused by the lesion exists only on one image, a gradient vector caused by noise exists in coordinates corresponding to the lesion in the other image. Thus, the inner product value of these normalized gradient fields has any value, thereby affecting the evaluation function. On the other hand, in the exemplary method, since the zero vector exists in the coordinates corresponding to the lesion in the other image, the inner product value becomes 0, so that no influence is given to the evaluation function. Thus, in the exemplary method, an improvement in the registration accuracy can be expected.

The combination of two images to be aligned can be applied not only to the combination of MR and US images but to images of all imaging modalities like the combinations of a CT image and a US image, and an MR image and a CT image. Since, however, the registration method based on the related art method using the normalized gradient field is of a method particularly effective where a US image is contained in an image targeted for registration, the registration method based on the exemplary method is also particularly effective for registration including the US image.

Further, if the threshold $TH_{Norm}$ is determined from the automatic estimated result of noise quantity as in the above-described modification, the threshold $TH_{Norm}$ can be optimized for each image, thus making it possible to expect higher accuracy registration.

Incidentally, in the exemplary embodiment, the evaluation function includes the square of the inner product of the feature vectors, but may include the Nth (where N is a natural number) power of the absolute value of an inner product of feature vectors.

The evaluation function may be a normalization of the square of the inner product of feature vectors or the N-th power of the absolute value of the inner product thereof by the size of an image, but may not be normalized. When the size of images to be aligned, i.e., the total number of pixels in each image almost remains unchanged, the registration accuracy can be retained to some degree even though done in this way.

Further, although the exemplary embodiment has shown the example in which the systems and methods described herein are applied to the registration of the images different from each other in imaging modality, the disclosure can also be applied to the registration of images identical in imaging modality and different in imaging time phase from each other. As such images, there are considered, for example, images before and after surgical operation, images of early and late phases in contrast imaging, etc. Further, the systems and methods described herein can be applied not only to medical images, but also to industrial images.

Furthermore, the exemplary embodiment is of the image processing apparatus, but a program for allowing a computer to function as such an image processing apparatus is also one example illustrative of an embodiment of the systems and methods described herein.

What is claimed is:

1. An image processing method for registering first and second images including the same subject, the method comprising repeating the following steps multiple times:

a first step comprising:
  determining feature vectors related to gradients of pixels values at coordinates on the first and second images for each of the coordinates;
  when the size of each of gradient vectors for the pixel values at the coordinates is greater than or equal to a predetermined threshold, determining the gradient vectors each normalized by a size of the gradient vector as the feature vectors at the coordinates; and
  when the size of the gradient vector is less than the predetermined threshold, determining a zero vector as the feature vectors at the coordinates;

a second step comprising calculating for all mutually corresponding coordinates on the first and second images, correlation values each equivalent to a value obtained by an N-th (where N is a natural number) power of an absolute value of an inner product of the feature vectors at the coordinates and determining an evaluation value including an integrated value of the correlation values calculated for each of the coordinates; and a third step comprising changing the second image such that the evaluation value becomes larger.

2. An image processing apparatus comprising:
a determining unit configured to:
  when the size of each of gradient vectors for pixel values at coordinates on first and second images including the same subject is greater than or equal to a predetermined threshold, determine for each of the coordinates, the gradient vectors each normalized by a size of the gradient vector as feature vectors at the coordinates; and
  determine, when the size of the gradient vector is less than the predetermined threshold, a zero vector as the feature vectors at the coordinates;

a calculating unit configured to:
  for all mutually corresponding coordinates on the first and second images, calculate correlation values each equivalent to a value obtained by an N-th (where N is a natural number) power of an absolute value of an inner product of the feature vectors at the coordinates; and
  determine an evaluation value including an integrated value of the correlation values calculated for each of the coordinates; and a changing unit configured to change the second image such that the evaluation value becomes larger, wherein the processing by the determining unit, the calculating unit and the changing unit is repeated plural times to register the first and second images.

3. The image processing apparatus according to claim 2, wherein the gradient vectors are primary partial differentiations in coordinate-axis directions in the images.

4. The image processing apparatus according to claim 3, wherein the correlation value is a value obtained by squaring the inner product of the feature vectors.

5. The image processing apparatus according to claim 2, wherein the evaluation value is a value obtained by normalizing the integrated value of the correlation values by a size of one of the first and second image.

6. The image processing apparatus according to claim 2, wherein the changing unit is configured to change the second image by at least one of parallel movement, rotation and deformation.

7. The image processing apparatus according to claim 2, wherein the determining unit is configured to determine the gradient vectors with respect to the first and second images, based on images obtained by performing structure enhancement filter processing and/or noise reduction processing to the first and second images.

8. The image processing apparatus according to claim 2, wherein the first and second images are medical images.

9. The image processing apparatus according to claim 8, wherein the first and second images are different in imaging modality from each other.

10. The image processing apparatus according to claim 9, wherein one of the first and second images is an ultrasound (US) image.

11. The image processing apparatus according to claim 2, wherein the determining unit, the calculating unit and the changing unit are configured to repeat their functions a predetermined number of times or until the evaluation value substantially converges.

12. The image processing apparatus according to claim 2, further including a unit configured to estimate a noise quantity in an object region of at least one of the first and second images and determine the threshold, based on the noise quantity.

13. The image processing apparatus according to claim 12, wherein the object region is a peripheral region for an anatomical feature point common between the first image and the second image.

14. The image processing apparatus according to claim 12, wherein the object region is a central region of at least one image.

15. The image processing apparatus according to claim 12, wherein the object region is a peripheral region of a lesion.

16. The image processing apparatus according to claim 12, wherein the object region is an entire image region.

17. The image processing apparatus according to claim 12, wherein the threshold determining unit is configured to obtain a gradient magnitude in each pixel of the object region and determine the threshold, based on a histogram of the gradient magnitudes.

18. The image processing apparatus according to claim 12, wherein the threshold determining unit is configured to calculate a noise quantity Nqt from any one of the following Equations a through f or an average value of a plurality of combinations thereof:

$$Nqt = M_{fmax} + \sigma \times HWHM_L \quad \text{Equation a}$$

$$Nqt = M_{fmax} + \sigma \times HWHM_R \quad \text{Equation b}$$

$$Nqt = M_{fmax} + \sigma \times (HWHM_L + HWHM_R)/2 \quad \text{Equation c}$$

$$Nqt = \sigma \times M_{fmax} \quad \text{Equation d}$$

$$Nqt = \sigma \times M_{mom1} \quad \text{Equation e}$$

$$Nqt = \sigma \times M_{mom2} \quad \text{Equation f}$$

where $M_{fmax}$ is a gradient magnitude which provides a most frequent value at a peak lowest in gradient magnitude, of peaks which appear on a distribution of the histogram, $HWHM_L$ is a half width at half maximum on the low value side as viewed from $M_{fmax}$ on the histogram distribution, $HWHM_R$ is a half width at half maximum on the high value side as viewed from $M_{fmax}$ on the histogram distribution, $M_{mom1}$ is a gradient magnitude equivalent to the center of gravity of a range in which the gradient magnitude on the histogram distribution is from 0 to $HWHM_R$, and $M_{mom2}$ is a gradient magnitude equivalent to the center of gravity of a range in which the gradient magnitude on the histogram distribution is from $HWHM_L$ to $HWHM_R$.

19. A program that when executed, causes a computer to function as an image processing apparatus according to claim 2.

20. A program that when executed, causes a computer to function as an image processing apparatus according to claim 12.

* * * * *